March 2, 1926.
O. J. BROUILLETTE
1,575,535
TRACTION CHAIN
Filed June 22, 1925
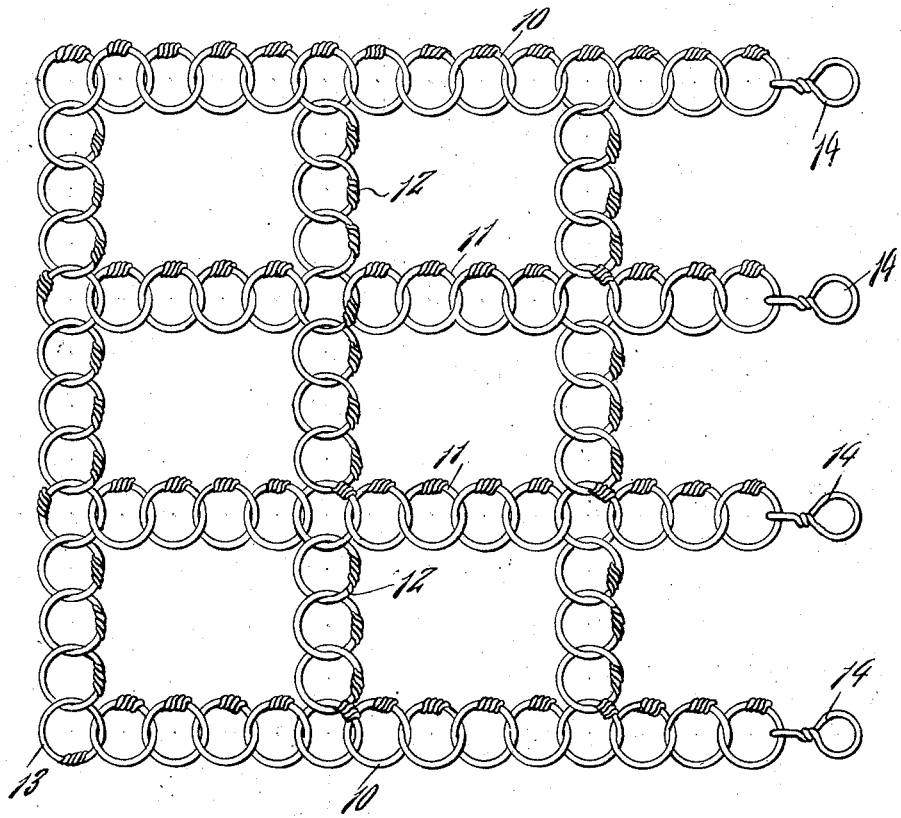
O. J. Brouillette
INVENTOR
BY Victor J. Evans
ATTORNEY
WITNESS:

Patented Mar. 2, 1926.

1,575,535

UNITED STATES PATENT OFFICE.

ORICE J. BROUILLETTE, OF GALESBURG, ILLINOIS.

TRACTION CHAIN.

Application filed June 22, 1925. Serial No. 38,886.

*To all whom it may concern:*

Be it known that I, ORICE J. BROUILLETTE, a citizen of the United States, residing at Galesburg, in the county of Knox and State of Illinois, have invented new and useful Improvements in Traction Chains, of which the following is a specification.

This invention relates to improvements in traction chains for use upon motor vehicle wheels and the like and contemplates the provision of side chains, cross chains and intermediate chains, each of which are formed of interconnecting rings formed of relatively heavy wire or the like having their respective end portions twisted a multiplicity of times upon themselves in order to form extra traction or gripping surfaces.

Another object of my invention is the provision of couplings attached to the ends of the side chains and intermediate chains and terminate in split overlapping end portions which are adapted to engage the corresponding opposite end portions of the side and intermediate chains and which owing to the overlapping relation of the split end portions thereof will prevent accidental displacement of the ring and prevent the usual circumferential movement of the chains upon the motor vehicle wheels and tires owing to the rigid connection facilitated thereby.

With the above and other objects in view, the invention further includes the following novel features and details of construction, to be hereinafter more fully described, illustrated in the accompanying drawing and pointed out in the appended claim.

In the drawing:—

The figure is a plan view of a portion of my chain.

Referring to the drawing in detail, wher in like characters of reference denote coi esponding parts, the reference character 10 indicates the side chains, 11 the intermediate chains having their opposite end rings secured between cross chains 12. Each of these chains 10, 11 and 12 are composed of a plurality of rings 13 having their opposite end portions making double or multiple twists upon themselves in order that a rigid association is thus formed between the split end portions of the rings as well as provide extra traction and gripping surfaces upon these rings 13.

As clearly illustrated in the figure of the drawing I have illustrated a plurality of couplings which are formed of singular lengths of relatively heavy wire, bent intermediately upon themselves and receiving one of the terminal rings 13 of the side and intermediate chains 10 and 11 respectively and are then twisted upon themselves as at 15 to provide a looped portion within the rings 13 while the remaining portion of the coupling or length of wire extends outwardly and inwardly in half looped portions and have their corresponding sides extending in opposite directions and lying flush one against the other and which are adapted to receive therebetween in the process of coupling the opposite ends of the terminal rings 13 included upon the opposite end portions of the cross and intermediate chains 10 and 11 and to securely hold the same against accidental displacement and hold the chain per se against circumferential movement upon the vehicle wheel.

It will thus be noted from the foregoing description and accompanying drawing that this invention provides an exceedingly useful and advantageous traction chain in which, owing to the provision of the multiple twists upon the split end portions of the rings 13, extra traction and gripping surfaces are provided thereby which will aid in preventing skidding and owing to the construction of the chain per se and owing to the relative arrangement of the cross chains, intermediate chains and side chains, will allow the intermediate chains to lie flush against the tread of the tire where the traction and anti-skidding preventive is most needed. It is also to be noted that owing to the specific construction of the couplings the said chain may be rigidly secured to the vehicle wheel and held against circumferential movement thereon.

The invention is susceptible of various changes in its form, proportions and minor details of construction, and the right is herein reserved to make such changes as properly fall within the scope of the appended claim.

Having described my invention what is claimed is:—

A traction chain comprising side, intermediate and cross chains respectively, and each of the chains formed of a plurality of inter-connecting split rings having their opposite end portions forming a multiplicity of twisted portions one upon the other to form traction surfaces.

In testimony whereof I affix my signature.

ORICE J. BROUILLETTE.